United States Patent
Kawasaki et al.

(10) Patent No.: US 6,765,757 B2
(45) Date of Patent: Jul. 20, 2004

(54) SOFT MAGNETIC FILM HAVING HIGH SATURATION MAGNETIC FLUX DENSITY, THIN-FILM MAGNETIC HEAD USING THE SAME, AND MANUFACTURING METHOD OF THE SAME

(75) Inventors: Mitsuo Kawasaki, Niigata-ken (JP); Yoshihiro Kanada, Niigata-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 0 days.

(21) Appl. No.: 10/041,354

(22) Filed: Jan. 8, 2002

(65) Prior Publication Data

US 2002/0132137 A1 Sep. 19, 2002

(30) Foreign Application Priority Data

Jan. 15, 2001 (JP) ......................................... 2001-005911

(51) Int. Cl.[7] .............................................. G11B 5/127
(52) U.S. Cl. ........................ 360/126; 428/611; 428/637; 428/678; 428/141; 428/692
(58) Field of Search ................................ 360/125, 126, 360/324, 324.12; 428/678, 679, 611, 141, 192, 692, 637; 252/62.55

(56) References Cited

U.S. PATENT DOCUMENTS

| 5,287,239 | A | | 2/1994 | Iwasaki | |
|---|---|---|---|---|---|
| 5,438,747 | A | * | 8/1995 | Krounbi et al. | 29/603.16 |
| 5,792,546 | A | * | 8/1998 | Kanamine et al. | 428/212 |
| 6,043,959 | A | * | 3/2000 | Crue et al. | 360/317 |
| 6,063,512 | A | | 5/2000 | Osaka et al. | |
| 6,132,892 | A | * | 10/2000 | Yoshikawa et al. | 428/692 |
| 6,146,776 | A | * | 11/2000 | Fukuzawa et al. | 428/692 |
| 6,178,070 | B1 | * | 1/2001 | Hong et al. | 360/317 |
| 6,256,178 | B1 | * | 7/2001 | Gill | 360/324.2 |
| 6,404,601 | B1 | * | 6/2002 | Rottmayer et al. | 360/317 |

OTHER PUBLICATIONS

Yamagishi, W., Hashimoto, K., Sato, T., Ogawa, S., and Henmi, Z. (IEEE Trans. Mag., 22(5), 1986, 641–643).*

Yu, R., Ren, Y., Basu, S., Unruh, K., Parvizi–Majidi, A., and Ziao, J. (J. Appl. Phys., 87(9), 2000, 5840–5842).*

* cited by examiner

*Primary Examiner*—Paul Thibodeau
*Assistant Examiner*—Kevin M. Bernatz
(74) *Attorney, Agent, or Firm*—Brinks Hofer Gilson & Lione (57) ABSTRACT

A soft magnetic film is formed of a CoFe alloy having an Fe content in the range of 68 to 80 mass %, thereby having a saturation magnetic flux density of 2.0 T or more. The center lain average roughness of the film surface is 9 nm or less. The soft magnetic film can achieve a corrosive resistant magnetic head with a high recording density.

10 Claims, 8 Drawing Sheets

SOFT MAGNETIC FILM HAVING HIGH SATURATION MAGNETIC FLUX DENSITY, THIN-FILM MAGNETIC HEAD USING THE SAME, AND MANUFACTURING METHOD OF THE SAME

BACKGROUND OF THE INVENTION

1. Field of the Invention

The present invention relates to a corrosive-resistant soft magnetic film formed of a CoFe alloy, which is used, for example, for the core of thin-film magnetic heads, having a saturation magnetic flux density larger than that of NiFe alloys. The present invention also relates to a thin-film magnetic head using the soft magnetic film and further relates to methods of manufacturing the soft magnetic film and the thin-film magnetic head.

2. Description of the Related Art

As the demand for a high recording density has been increasing, a magnetic material having a high saturation magnetic flux density Bs has been required to be used for, for example, the core layer of a thin-film magnetic head so that the magnetic flux is concentrated in the vicinity of the gap in the core to improve the recording density.

NiFe alloys are typically used for a magnetic material. The NiFe alloys are formed by electroplating with direct current and have a saturation magnetic flux density Bs of about 1.8 T.

In order to increase the saturation magnetic flux density of the NiFe alloys, for example, a pulsed current has been used for electroplating instead of using a direct current.

Thus, the saturation magnetic flux density Bs of the NiFe alloys has been improved. However, the Bs is at most 1.9 T and a Bs of 2.0 T or more is rarely achieved.

Increasing the saturation magnetic flux density Bs causes the film surface to become rough, and consequently the NiFe alloys are readily eroded by various solvents used for manufacturing the thin-film magnetic heads.

Alternatively, CoFe alloys are often used for a magnetic material. The Co content of a typical CoFe alloy is about 50 mass %, and such a composition ratio results in a film having a low saturation magnetic flux density Bs and an extremely rough surface, and therefore the film can be eroded.

SUMMARY OF THE INVENTION

Accordingly, an object of the present invention is to provide a corrosion-resistant soft magnetic CoFe alloy film having a saturation magnetic flux density Bs higher than that of NiFe alloys, a thin-film magnetic head using the soft magnetic film, and methods of manufacturing the soft magnetic film and the magnetic head.

To this end, according to one aspect of the present invention, there is provided a soft magnetic film comprising a composition expressed by the formula $Co_{1-x}Fe_x$. The Fe content X is in the range of 68 to 80 mass %.

The soft magnetic film may have a saturation magnetic flux density Bs of 2.0 T or more, and preferably the saturation magnetic flux density Bs is 2.25 T or more.

Thus, the film is prevented from having a large crystalline grain size and can have a dense crystal; hence the corrosive resistant soft magnetic film can be manufactured.

The soft magnetic film may have a center line average roughness of the surface of 9 nm or less.

By preventing the film from having a large crystalline grain size, a low coercive force Hc can be achieved.

Preferably, the soft magnetic film is formed by plating, thereby having a desired thicker film thickness than those of films formed by sputtering.

According to another aspect of the present invention, a thin-film magnetic head is provided. The thin-film magnetic head comprises a lower core layer formed with a magnetic material, a magnetic gap, and an upper core layer. The upper core layer opposes the lower core layer with the magnetic gap there between at the face opposing a recording medium of the magnetic head. A coil layer is also comprised to apply a recording magnetic field to the lower and the upper core layers. The lower core layer or the upper core layer is formed of the soft magnetic film.

Preferably, the thin-film magnetic head may further comprise a lower magnetic pole layer formed of the soft magnetic film on the lower core layer and at the face opposing a recording medium thereof.

According to another aspect of the present invention, there is provided a thin-film magnetic head comprising a lower core layer, an upper core layer, and a magnetic pole lying between the lower core layer and the upper core layer. The magnetic pole has a shorter width in the track width direction than those of the lower and the upper core layers. The magnetic pole comprises a lower magnetic pole layer in contact with the lower core layer, an upper magnetic pole layer in contact with the upper core layer, and a gap layer lying between the lower magnetic pole layer and the upper magnetic pole layer. Alternatively, the magnetic pole comprises an upper magnetic pole layer in contact with the upper core layer and a gap layer lying between the upper magnetic pole layer and the lower core layer. The upper magnetic pole layer or the lower magnetic pole layer is formed of the soft magnetic film described.

Preferably, the area, adjacent to the magnetic gap, of the lower core layer or the upper core layer has at least two magnetic sub layers. Alternatively, the lower magnetic pole layer or the upper magnetic pole layer has at least two magnetic sub layers. The magnetic sub layer in contact with the magnetic gap is formed of the soft magnetic film.

Preferably, the magnetic sub layer which is not in contact with the magnetic gap is formed of a CoFe alloy having an Fe content X lower than that of the magnetic sub layer in contact with the magnetic gap.

Thus, the CoFe alloy for the soft magnetic film has a saturation magnetic flux density Bs of 2.0 T or more and a lower roughness. By using the soft magnetic film as a core material for thin-film magnetic heads, the magnetic flux can be concentrated on the vicinity of the magnetic gap to facilitate a high recording density. Also, corrosive resistant thin-film magnetic heads can be efficiently manufactured.

According to a methodical aspect of the present invention, a method of manufacturing a soft magnetic film comprising a step of forming a $Co_{1-x}Fe_x$ alloy by electroplating with a pulsed current is provided. The $Co_{1-x}Fe_x$ alloy has an Fe content X in the range of 68 to 80 mass %. The Fe/Co ion concentration ratio of the plating bath is in the range of 1.5 to 2.5.

In electroplating using a pulsed current, the current is intermittently applied by, for example, repeating on-off control by a current controlling device. By setting a pause time for applying no current, the CoFe alloy film can be gradually deposited, and the deviation of the current densities at plating can be alleviated in comparison with plating with a direct current. Thus, the electroplating with a pulsed current facilitates the control of the Fe content of the CoFe alloy to increase the Fe content of the film.

In addition, a Fe/Co ion concentration ratio of the plating bath in the range of 1.5 to 2.5 leads to a CoFe alloy having a Fe content in the range of 68 to 80 mass %, thus achieving a CoFe alloy having a high saturation magnetic flux density Bs of 2.0 T or more and a surface with a low center line average roughness Ra of 9 nm or less.

Preferably, the plating bath contains sodium saccharin to serve as a stress alleviator. Thus, the film stress of the CoFe alloy is lowered.

Preferably, the plating bath contains 2-butyne-1,4-diol to prevent the CoFe alloy from having a large crystalline grain size. Thus, the CoFe alloy has a small crystalline grain size and few voids among the crystals, hence having a smooth surface. As a result, the coercive force Hc is reduced.

Preferably, the plating bath contains sodium 2-ethylhexyl sulfate, which serves as a surfactant, to eliminate hydrogen generated in the plating bath, so that the formation of a rough film surface caused by the trapped hydrogen is inhibited.

Sodium lauryl sulfate may be used in stead of sodium 2-ethylhexyl sulfate; however, sodium 2-ethylhexyl sulfate foams less than sodium lauryl sulfate, and therefore a larger amount of sodium 2-ethyhexyl sulfate can be added to the plating bath to adequately eliminate the hydrogen.

According to another methodical aspect of the present invention, there is provided a method of manufacturing a thin-film magnetic head. The method comprises the steps of forming a lower core layer of a magnetic material, forming a magnetic gap, and forming an upper core layer. The upper core layer opposes the lower core layer with the magnetic gap therebetween at the face opposing a recording medium thereof. A step of forming a coil layer is comprised to apply a recording magnetic field to the lower and the upper core layers. The lower or the upper core layer is formed of the soft magnetic film by the method described above.

Preferably, the method further comprises a step of forming a lower magnetic pole layer of the soft magnetic film by plating on the lower core layer and at the face opposing a recording medium thereof.

According to anther methodical aspect of the present invention, there is provided a method of manufacturing a thin-film magnetic head comprising the steps of forming a lower core layer, forming an upper core layer, and forming a magnetic pole. The magnetic pole lies between the lower core layer and the upper core layer and has a shorter width in the track width direction than those of the lower and the upper core layers. The step of forming the magnetic pole comprises the sub steps of forming a lower magnetic pole layer on the lower core layer, forming a gap layer on the lower magnetic pole layer, and forming an upper magnetic pole layer between the gap layer and the upper core layer. Alternatively, the step of forming a gap layer on the lower core layer and forming an upper magnetic pole layer between the gap layer and the upper core layer. The upper magnetic pole layer or the lower magnetic pole layer is formed of the soft magnetic film by the method described above.

Preferably, the area, adjacent to the magnetic gap, of the lower core layer or the upper core layer is formed so as to have at least two magnetic sub layers. Alternatively, the lower magnetic pole layer or the upper magnetic pole layer may be formed so as to have at least two magnetic sub layers. The magnetic sub layer in contact with the magnetic gap is formed of the soft magnetic film by the method of manufacturing the soft magnetic film.

Preferably, the magnetic sub layer which is not in contact with the magnetic gap is formed of a CoFe alloy having an Fe content X lower than that of the magnetic sub layer in contact with the magnetic gap.

Accordingly, by forming the CoFe alloy for a soft magnetic film by plating with a pulsed current at an Fe/Co ion concentration ratio in the range of 1.5 to 2.5, the CoFe alloy can have an Fe content in the range of 68 to 80 mass %.

Using the soft magnetic film as a core material for thin-film magnetic heads results in an increased saturation magnetic flux density Bs, thereby achieving a high recording density. Also, corrosive resistant thin-film magnetic heads can be efficiently manufactured.

DESCRIPTION OF THE PREFERRED EMBODIMENTS

Figure 1:
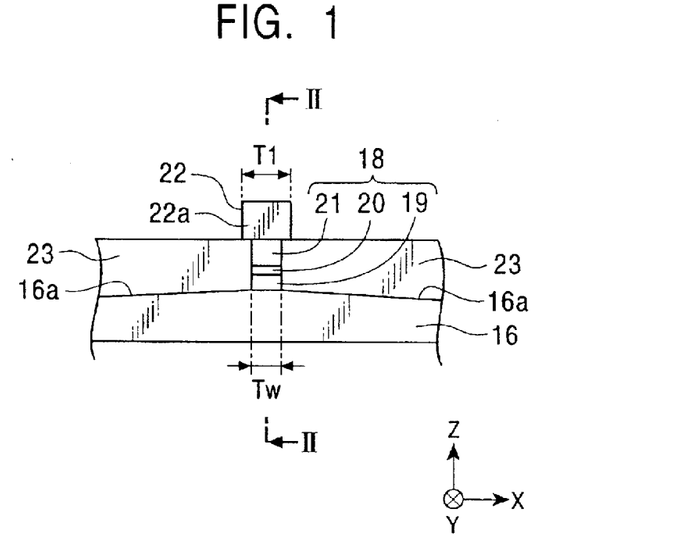
FIG. 1 is a fragmentary front view of a thin-film magnetic head according to a first embodiment of the present invention.
Figure 2:
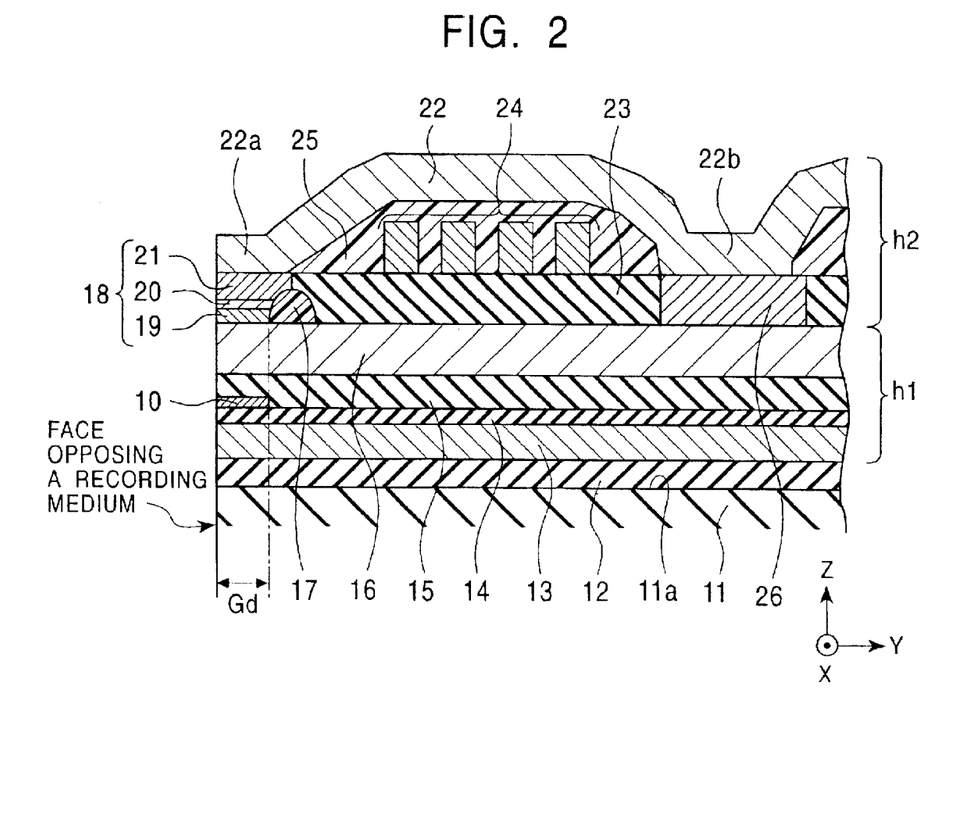
FIG. 2 is a longitudinal sectional view of FIG. 1.

FIG. 1 is a fragmentary front view of a thin-film magnetic head according to a first embodiment of the present invention and FIG. 2 is a longitudinal sectional view taken along the II—II line in FIG. 1.

A thin-film magnetic head of the present invention is prepared on a trailing side 11a of a ceramic slider 11 included in a floating head, and is a magnetoresistive (MR)/inductive composite type thin-film magnetic head (hereinafter simply referred to as a thin-film magnetic head) formed by laminating an MR head h1 and an inductive head h2.

The MR head is used for reading recorded signals by detecting a leakage field from a recording medium, such as a hard disk, by means of a magnetoresistance effect.

As shown in FIG. 2, an $Al_2O_3$ layer 12, a lower shield layer 13 formed of a magnetic material such as a NiFe alloy, and a lower gap layer 14 formed of an insulating material are deposited on the trailing side 11a of the slider 11 in that order.

The lower gap layer 14 is provided with a magnetoresistive sensor 10, such as an anisotropic magnetoresistive (AMR) sensor, a giant magnetoresistive (GMR) sensor, or a tunneling magnetoresistive (TMR) sensor, thereon. The magnetoresistive sensor 10 and the lower gap layer 14 are provided with an upper gap layer 15 formed of an insulating material thereon. The upper gap layer 15 is provided with an upper shield layer 16 formed of a magnetic material, such as NiFe alloy, thereon. Thus, the MR head h1 is composed of laminated layers from the lower shield layer 13 to the upper shield layer 16.

In the embodiment shown in FIGS. 1 and 2, the upper shield layer 16 also serves as a lower core layer of the inductive head h2. The lower core layer 16 is provided with a gap depth (Gd) controlling layer 17 for controlling the gap depth which is determined by the distance between the face opposing a recording medium and an edge thereof. The Gd controlling layer is formed of an insulating material.

The top surface 16a of the lower core layer 16 inclines from both sides of a magnetic pole 18 in the track width direction, as shown in FIG. 1, thereby inhibiting generation of a side fringing magnetic field.

The magnetic pole 18 extends from the face opposing a recording medium to the Gd controlling layer 17, as shown in FIG. 2.

The magnetic pole 18 is formed by depositing a lower magnetic pole layer 19, a nonmagnetic gap layer 20, and an upper magnetic pole layer 21 in that order.

The lower magnetic pole layer 19 is formed by directly plating the lower core layer 16. The gap layer 20 deposited on the lower magnetic pole layer 19 is preferably formed of a nonmagnetic metal capable of being plated, and is specifically formed of a metal selected from the group consisting of NiP, NiPd, NiW, NiMo, Au, Pt, Rh, Pd, Ru, and Cr.

In the present invention, the gap layer 20 is formed of NiP to be nonmagnetic.

The upper magnetic pole layer 21 deposited on the gap layer 20 is magnetically coupled with an upper core layer 22 provided thereon.

By forming the gap layer 20 of a nonmagnetic metal capable of being plated, the lower magnetic pole layer 19, the gap layer 20, and the upper magnetic pole layer 21 can be consecutively plated.

The magnetic pole 18 may be composed of two layers of the gap layer 20 and the upper magnetic pole layer 21.

As shown in FIG. 1, the magnetic pole 18 is formed with a track width Tw in the track width direction (the X direction shown in the drawing).

As shown in FIGS. 1 and 2, an insulating layer 23 is deposited at both sides of the magnetic pole 18 in the track width direction (the X direction) and at the back of the magnetic pole 18 in the height direction (the Y direction). The top surface of the insulating layer 23 is aligned with the top surface of the magnetic pole 18.

The insulating layer 23 is provided with a spirally patterned coil layer 24, as shown in FIG. 2. The coil layer 24 is covered with an organic insulating layer 25.

As shown in FIG. 2, an upper core layer 22 is patterned by flame plating on the magnetic pole 18 and on the organic insulating layer 25. An end 22a of the upper coil layer 22 has a width T1 in the track width direction at the face opposing a recording medium, as shown in FIG. 1. The width T1 is larger than the track width Tw.

A base 22b of the upper core layer 22 is directly coupled with a coupling layer (a back gap layer) 26 formed of a magnetic material on the lower core layer 16, as shown in FIG. 2.

The upper magnetic pole layer 21 and/or the lower magnetic pole layer 19 are formed of a soft magnetic film having the following composition in the present invention.

The composition formula of the soft magnetic film is represented by $Co_{1-x}Fe_x$, wherein the ratio of Fe, X, is in the range of 68 to 80 mass %.

The Fe content X of a typical CoFe alloy is, for example, about 50 mass %. In contrast, the Fe content X of the present invention is larger than those of known CoFe alloys and is in the range of 68 to 80 mass %.

This is because the larger Fe content X allows the saturation magnetic flux density Bs to be 2.0 T or more, and preferably to be 2.25 T or more. The saturation magnetic flux density is larger than that of NiFe alloys and this larger saturation magnetic flux density is ensured in the present invention.

Also, by forming the lower magnetic pole layer 19 and/or the upper magnetic pole layer 21 of the CoFe alloy having the composition described above via the gap layer, the magnetic flux can be concentrated in the vicinity of the gap. Thus, a thin-film magnetic head capable of satisfying the demand for high recording density can be manufactured.

In addition, the composition of the CoFe alloy results in a dense crystal, thereby inhibiting the film surface from becoming rough and improving the corrosion resistance of the film. Thus, the film is prevented from corrosion by solvents used in the manufacturing process of the magnetic head. In the present invention, the center line average roughness (Ra) of the CoFe alloy surface can be 9 nm or less.

Furthermore, by inhibiting the film surface from becoming rough, the coercive force Hc can be reduced, and more specifically can be reduced to 1580 A/m or less.

When the Fe content X is, in contrast, less than 68 mass % or more than 80 mass %, the saturation magnetic flux density Bs is reduced to less than 2.0 T. The center line average roughness of the film surface also increases to more than 9 nm, so that the corrosion resistance is deteriorated, and further the coercive force Hc tends to become larger than 1580 A/m.

The composition having an Fe content in the range of 68 to 80 mass % leads to a specific resistance of 25 $\mu\Omega \cdot cm$ or more and a film stress of 400 MPa or less, and further leads to a anisotropy field Hk nearly equal to those of general NiFe alloys.

The CoFe alloy described above may be used for other thin-film magnetic heads.

Figure 3:
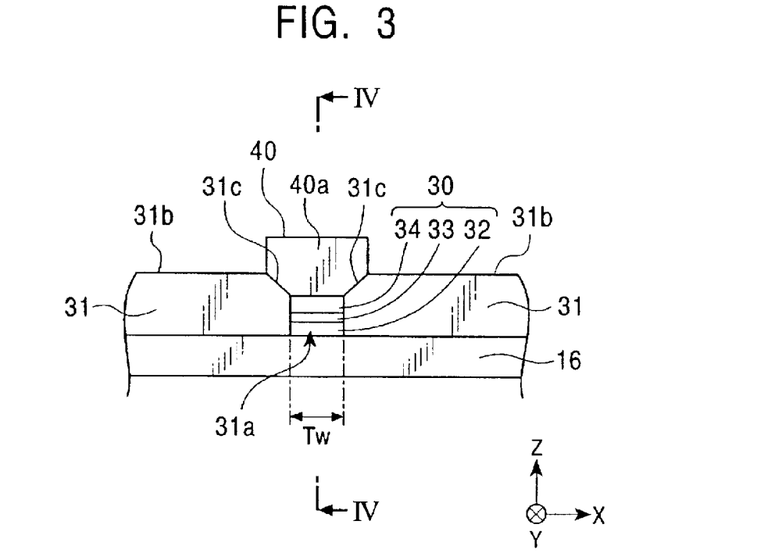
FIG. 3 is a thin-film magnetic head according to a second embodiment of the present invention.
Figure 4:
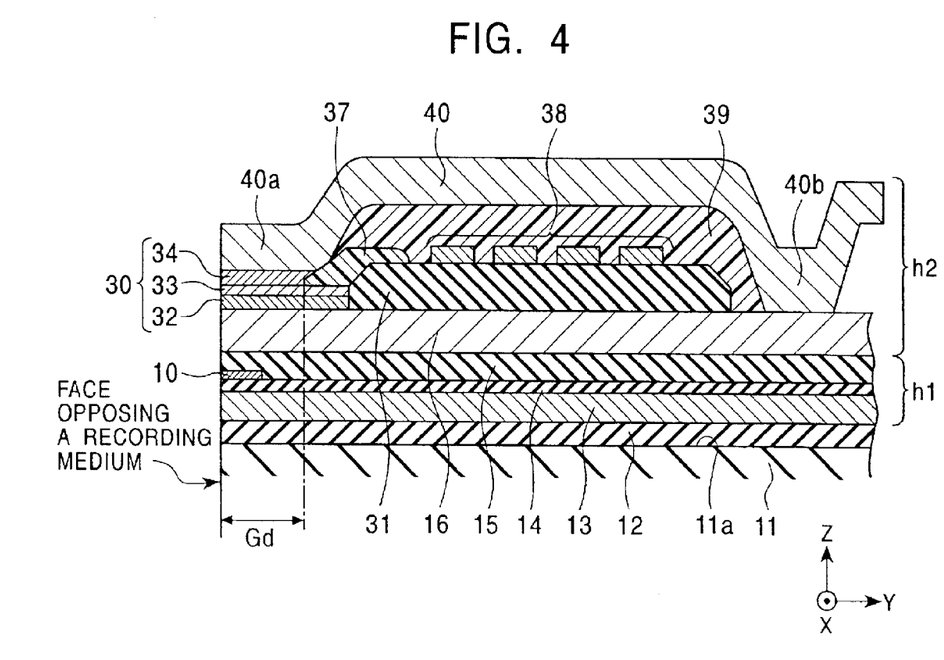
FIG. 4 is a longitudinal sectional view of FIG. 2.

FIG. 3 is a fragmentary front view of a thin-film magnetic head according to a second embodiment of the present invention and FIG. 4 is a longitudinal sectional view taken along the line IV—IV in FIG. 3 and viewed from the arrow.

The MR head h1 of the second embodiment has the same structure as FIGS. 1 and 2.

As shown FIG. 3, an insulating layer 31 is deposited on the lower core layer 16. The insulating layer 31 has a track-width-controlling slit 31a with a predetermined width formed towards the rear in the height direction (the Y direction) from the face opposing a recording medium. The track-width-controlling slit 31a is formed so as to have a width of the track width Tw at the face opposing a recording medium, as shown in FIG. 3.

The track-width-controlling slit 31a is provided with a lower magnetic pole layer 32, a nonmagnetic gap layer 33, and an upper magnetic pole layer 34 therein in that order to form a magnetic pole 30.

The lower magnetic pole layer 32 is formed by directly plating the lower core layer 16. The gap layer 33 deposited on the lower magnetic pole layer 32 is preferably formed of a nonmagnetic metal capable of being plated, and is specifically formed of a metal selected from the group consisting of NiP, NiPd, NiW, NiMo, Au, Pt, Rh, Pd, Ru, and Cr.

In the present invention, the gap layer 33 is formed of NiP to be nonmagnetic.

The magnetic pole 30 may be composed of two layers of the gap layer 33 and the upper magnetic pole layer 34.

A gap depth (Gd) controlling layer 37 is provided on the gap layer 33 from a point Gd away from the face opposing a recording medium to the top of the insulating layer 31.

The upper magnetic pole layer 34 deposited on the gap layer 33 is magnetically coupled with an upper core layer 40 provided thereon.

By forming the gap layer 33 of a nonmagnetic metal capable of being plated, the lower magnetic pole layer 32, the gap layer 33, and the upper magnetic pole layer 34 can be consecutively plated.

The insulating layer 31 is provided with a spirally patterned coil layer 38, as shown in FIG. 4. The coil layer 38 is covered with an organic insulating layer 39.

As shown in FIG. 3, the insulating layer has slopes 31c such that both sides of the track-width-controlling slit 31a in the track width direction (the x direction) diverges from the top of the magnetic pole layer 34 to the top surface 31b of the insulating layer 31.

An end 40a of the upper core layer 40 is formed from the top of the upper magnetic pole layer 34 along the slopes 31c in the directions retreating from the lower core layer 16, as shown in FIG. 3.

The upper core layer 40 is, as shown in FIG. 4, formed on the insulating layer 39 from the face opposing a recording medium in the height direction (the Y direction), and a base 40b of the upper core layer 40 is directly formed on the lower core layer 16.

The lower magnetic pole layer 32 and/or the upper magnetic pole layer 34 are formed of a CoFe alloy of which the Fe content is in the range of 68 to 80 mass % in the second embodiment.

By forming the lower magnetic pole layer 32 and/or the upper magnetic pole layer 34 of the CoFe alloy having a high saturation magnetic flux density Bs of 2.0 T or more, the magnetic flux can be concentrated in the vicinity of the gap. Thus, a thin-film magnetic head capable of satisfying the demand for high recording density can be manufactured. Preferably, the saturation magnetic flux density Bs is 2.25 T or more.

Also, the composition of the CoFe alloy results in a dense crystal, thereby inhibiting the film surface from becoming rough and improving the corrosion resistance of the film. The center line average roughness (Ra) of the CoFe alloy surface can be 9 nm or less in the present invention. In addition, the coercive force Hc can be reduced.

Each of magnetic heads according to the embodiments shown in FIGS. 1 to 4 has the magnetic pole 18 or 30 between the lower core layer 16 and the upper core layer 22 or 40. The lower magnetic pole layer 19 or 32 and/or the upper magnetic pole layer 21 or 34 included in the magnetic pole 18 or 30 are formed of a CoFe alloy of which the Fe content is in the range of 68 to 80 mass %. The lower magnetic pole layer 19 or 32 and/or the upper magnetic pole layer 21 or 34 may be composed of more than one magnetic sub layer in the present invention. In this instance, a magnetic sub layer in contact with the gap layer 20 or 33 is preferably formed of the CoFe alloy having the composition ratio described above. The composition ratio allows the magnetic flux to be concentrated in the vicinity the gap, and thus a thin-film magnetic head capable of satisfying the demand for high recording density can be manufactured.

The other magnetic sub layers other than the magnetic sub layer in contact with the gap layer 20 or 33 are preferably formed of a CoFe alloy having the Fe content lower than that of the magnetic sub layer in contact with the gap layer 20 or 33, so that the magnetic sub layer in contact with the gap layer 20 or 33 can have a larger saturation magnetic flux density Bs than the other magnetic sub layers. Thus, the magnetic flux is concentrated in the vicinity of the gap. The magnetic sub layers other than the layer in contact with the gap layer 20 or 33 are not necessarily formed of a CoFe alloy and may be formed of, for example, a NiFe alloy. In this instance, the Fe content of the NiFe alloy may be larger than that of the CoFe alloy forming the magnetic sub layer in contact with the gap layer 20 or 33. This is because NiFe alloys do not lead to a saturation magnetic flux density of more than 2.0 T, and, as shown in an experimental result described later, even if the Fe content of a NiFe alloy is about 73 mass %, the saturation magnetic flux density Bs is 1.9 T.

The saturation magnetic flux density Bs of the lower magnetic pole layer 19 or 32 is preferably high. However, a saturation magnetic flux density Bs of the lower magnetic pole layer 19 or 32 lower than that of the upper magnetic pole layer 21 or 34 facilitates the reversing of the leakage field between the upper and the lower magnetic pole layers, thereby improving the recording density on the recording media.

The lower core layer 16 and the upper core layer 22 or 40 may be formed of the CoFe alloy having the composition ratio described above. In this instance, the composition ratio of the CoFe alloy is preferably controlled so that the saturated magnetic flux densities Bs of the upper magnetic pole layer 21 or 34 and the lower magnetic pole layer 19 or 32 are higher than those of the lower core layer 16 and the upper core layer 22 or 40.

Figure 5:
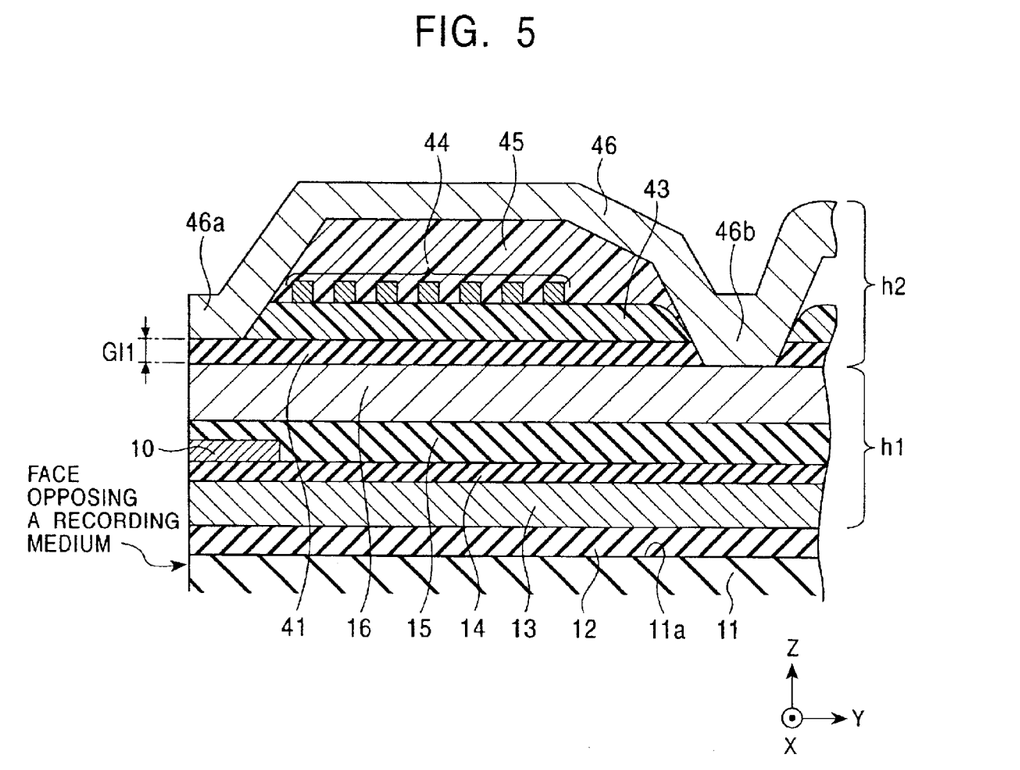
FIG. 5 is a longitudinal sectional view of a thin-film magnetic head according to a third embodiment of the present invention.

FIG. 5 is a longitudinal sectional view of a thin-film magnetic head according to a third embodiment of the present invention. The MR head h1 in this embodiment is the same as that shown in FIG. 1. The core layer 16 is provided with a magnetic-gap layer (nonmagnetic material layer) 41 formed of alumina. The magnetic-gap layer 41 is provided with an insulating layer 43 formed of a polyimide or a resistive material and a coil layer 44 patterned so as to have plane spirals thereon in that order. The coil layer is formed of a conductive nonmagnetic material such as copper (Cu).

The coil layer 44 is covered with an insulating layer 45 formed of a polyimide or a resistive material, and an upper core layer 46 is formed of a soft magnetic material on the insulating layer 45.

As shown FIG. 5, an end 46a of the upper core layer 46 is, at the face opposing a recording medium, provided with a magnetic gap having a gap length of G11 and opposing the lower core layer 16 via the magnetic-gap layer 41. The base 46b of the upper core layer 46 is magnetically coupled with the lower core layer 16.

The lower core layer 16 and/or the upper core layer 46 are formed of a CoFe alloy of which the Fe content is in the range of 68 to 80 mass %, so that the CoFe alloy has a saturation magnetic flux density Bs of 2.0 T or more and, depending on the composition ratio of the alloy, can have a saturation magnetic flux density Bs of 2.25 T or more.

By forming the lower core layer 16 and/or the upper core layer 46 of the CoFe alloy having a saturation magnetic flux density Bs of 2.0 T or more, the magnetic flux can be concentrated in the vicinity of the gap. Thus, a thin-film magnetic head capable of satisfying the demand for high recording density can be manufactured.

In addition, the composition of the CoFe alloy results in a dense crystal, thereby inhibiting the film surface from becoming rough and improving the corrosion resistance of the film. In the present invention, the center line average roughness (Ra) of the CoFe alloy surface can be 9 nm or less, and the coercive force Hc can be reduced, and more specifically can be reduced to 1580 A/m or less.

The CoFe alloy having the composition described above leads to a specific resistance of 25 $\mu\Omega$•cm or more and a film stress of 400 MPa or less, and further leads to an anisotropy field Hk nearly equal to those of general NiFe alloys.

Figure 6:
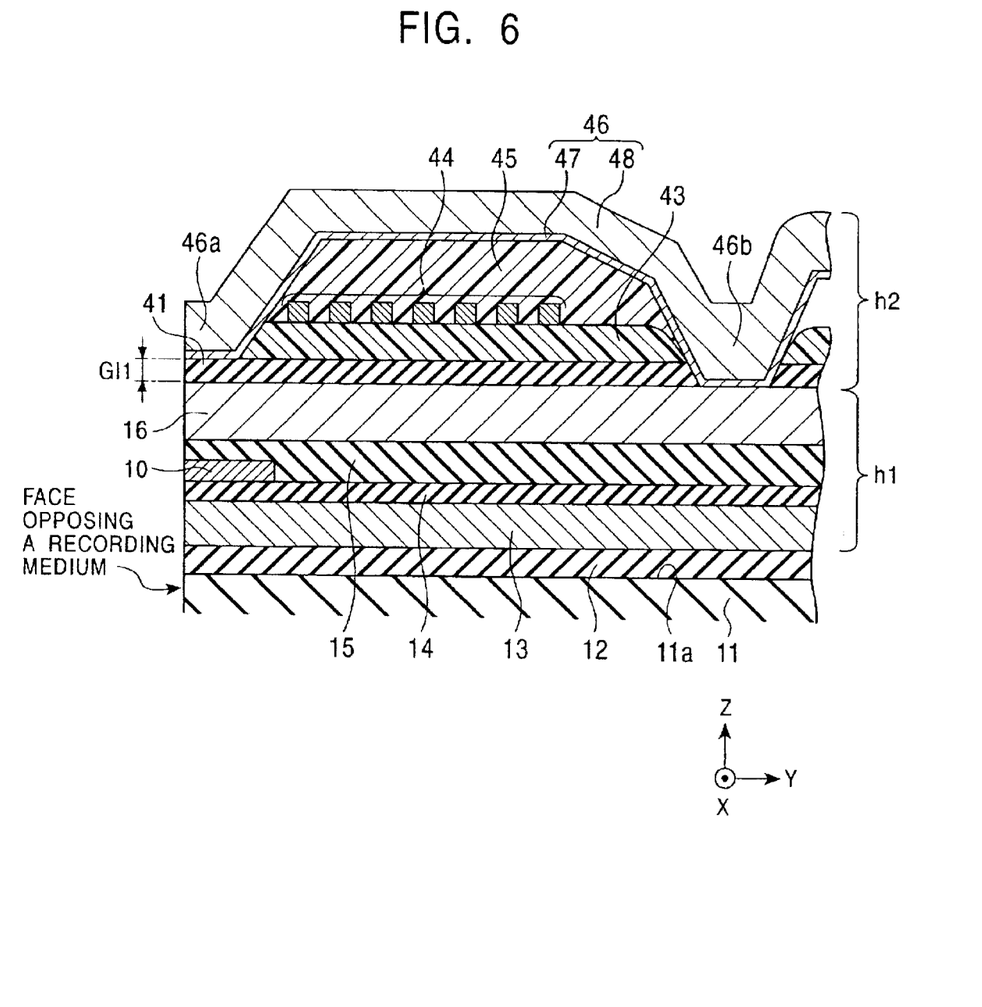
FIG. 6 is a longitudinal sectional view of a thin-film magnetic head according to a fourth embodiment of the present invention.

FIG. 6 is a longitudinal sectional view of a thin-film magnetic head according to a forth embodiment of the present invention, and differs from FIG. 5 in that the upper core layer 46 is composed of two layers.

More specifically, the upper core layer 46 is composed of a high Bs layer 47 having a high saturation magnetic flux density and an upper layer 48 deposited on the high Bs layer 47.

The high Bs layer 47 is formed of a CoFe alloy of which the Fe content is in the range of 68 to 80 mass %.

This composition ratio allows the high Bs layer 47 to have a saturation magnetic flux density of at least 2.0 T, preferably 2.25 T or more.

The CoFe alloy of which the Fe content is in the range of 68 to 80 mass % allows the high Bs layer 47 to have a dense crystal, thereby inhibiting the film surface from becoming rough, improving the corrosion resistance of the film, and reducing the coercive force Hc. More specifically, the center line average roughness (Ra) of the high Bs layer surface can be 9 nm or less, and the coercive force Hc can be reduced to 1580 A/m or less. In addition, the composition ratio of the CoFe alloy leads to a specific resistance of 25 $\mu\Omega$•cm or more and a film stress of 400 MPa or less.

Although the upper layer 48 included in the upper core layer 46 has a saturation magnetic flux density Bs lower than that of the high Bs layer 47, the specific resistance thereof is larger than that of the high Bs layer 47. The upper layer 48 is formed of a CoFe alloy and preferably the Fe content of the alloy is less than that of the high Bs layer 47. Thus, the high Bs layer 47 has a saturation magnetic flux density Bs larger than that of the upper layer 48 and the magnetic flux is concentrated in the vicinity of the gap, so that the recording resolution can be improved. The upper layer 48 is not necessarily formed of a CoFe alloy and may be formed of, for example, a NiFe alloy. In this instance, the Fe content of the NiFe alloy may be larger than that of the CoFe alloy forming the high Bs layer 47. This is because NiFe alloys do not lead to a saturation magnetic flux density of more than 2.0 T, and, as shown in an experimental result described later, even if the Fe content of a NiFe alloy is about 73 mass %, the saturation magnetic flux density Bs is 1.9 T.

By including the upper layer 48 having a high specific resistance in the upper core layer 46, the eddy-current loss caused by an increased recording frequency can be lowered, and thus a thin-film magnetic head capable of satisfying the demand for a high recording frequency can be manufactured. The upper layer 48 is preferably formed of a NiFe alloy rather than a CoFe alloy because NiFe alloys results in a higher specific resistance than CoFe alloys, as shown in an experimental result described later.

Also, the high Bs layer 47 is preferably formed on the underside of the upper core layer 46 facing the magnetic-gap layer 41, and may be formed only on the end 46a of the upper core layer 46 directly contacting the magnetic-gap layer 41.

The lower core layer 16 may also be composed of two layers of a high Bs layer and a high specific resistance layer. In this instance, the high Bs layer is deposited on the high specific resistance layer, facing the upper core layer 46 via the magnetic-gap layer 41.

Although the upper core layer 46 is composed of two layers in FIG. 6, it may be formed with three or more layers. In this case, the high Bs layer 47 is preferably formed so as to contact the magnetic-gap layer 41.

Figure 7:
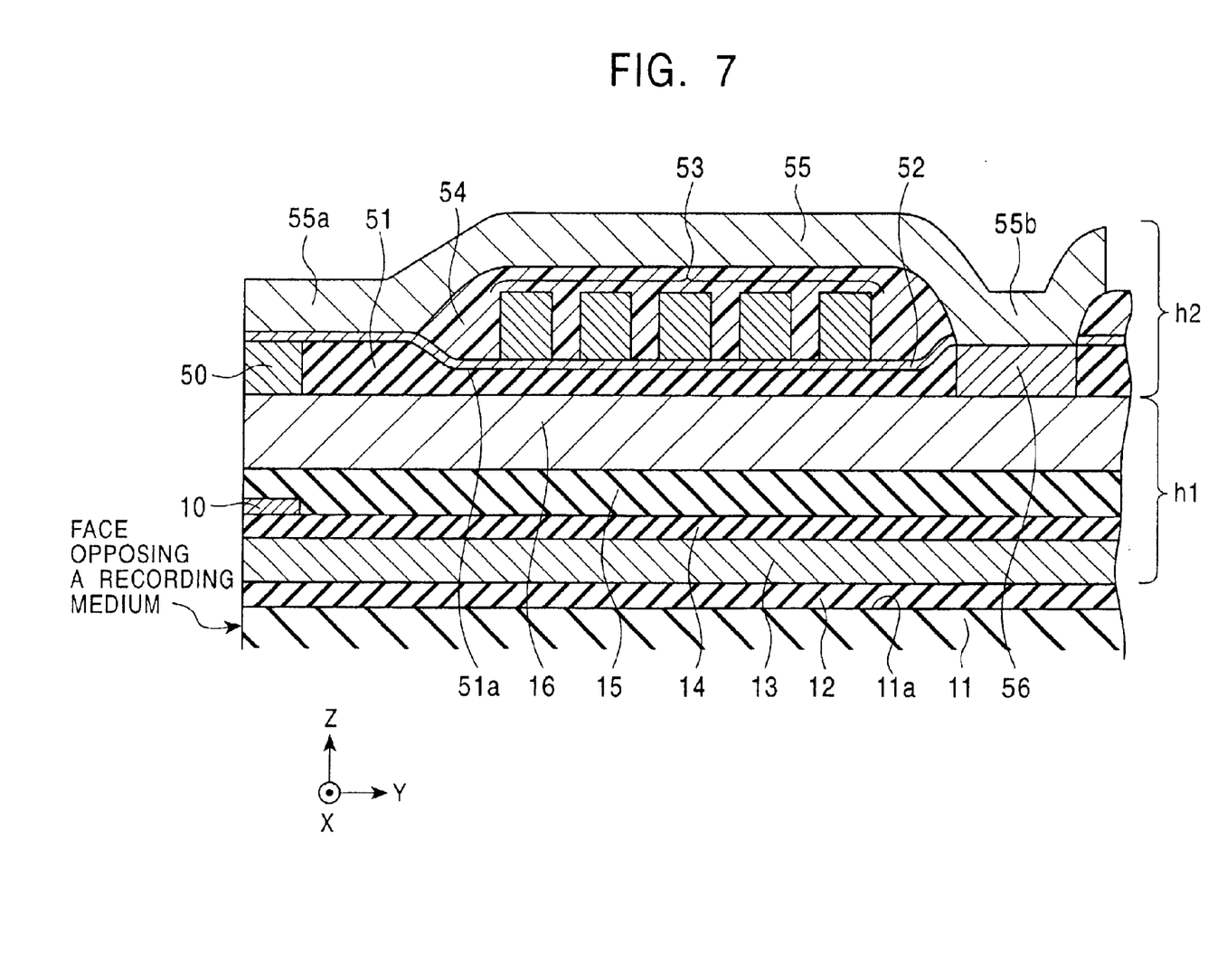
FIG. 7 is a longitudinal sectional view of a thin-film magnetic head according to a fifth embodiment of the present invention.

FIG. 7 is a longitudinal sectional view of the thin-film magnetic head according to a fifth embodiment of the present invention. The MR head h1 of the fifth embodiment has the same structure as shown in FIG. 1. A lower magnetic pole layer 50 is deposited on the lower core layer 16 at the face opposing a recording medium. The lower magnetic pole layer 50 is provided with an insulating layer 51 on the back thereof in the height direction (the Y direction). The top surface of the insulating layer 51 is recessed to be a coil-forming surface 51a.

A gap layer 52 is deposited on the lower magnetic pole layer 50 and the insulating layer 51. The coil-forming surface 51a of the insulating layer 51 is provided with a coil layer 53 via the gap layer 52. The coil layer 53 is covered with an insulating layer 54 formed of an organic insulating material.

As shown in FIG. 7, an upper core layer 55 is patterned on the gap layer 52 and the organic insulating layer 54 by, for example, flame plating.

An end 55a of the upper core layer 55 is formed on the gap layer 52 to face the lower magnetic pole layer 50. A base 55b of the upper core layer 55 is magnetically coupled with the lower core layer 16 via a bank layer 56.

The upper core layer 55 and/or the lower magnetic pole layer 50 are formed of a CoFe alloy in the fifth embodiment of which the Fe content is in the range of 68 to 80 mass % in the fifth embodiment.

In FIG. 7, by forming the lower magnetic pole layer 50 so as to have a saturation magnetic flux density Bs higher than that of the lower core layer 16, the magnetic flux can be concentrated in the vicinity of the gap to improve the recording density.

The upper core layer 55 may be formed entirely of the CoFe alloy described above. Also, the upper core layer 55 may be composed of two or more magnetic sub layers, as shown in FIG. 6, of which the layer facing the gap layer 52 is formed of the CoFe alloy to serve as a high Bs layer. In this instance, preferably, only the end 55a of the upper core layer 55 is composed of two or more magnetic sub layers such that the high Bs layer thereof makes contact with the gap layer 52, thus the magnetic flux is concentrated in the vicinity of the gap to improve the recording density.

The CoFe alloy shown in FIGS. 1 to 7 is preferably formed by plating, and can be formed by electroplating with a pulsed current in the present invention.

By forming the CoFe alloy by plating, the film can have a desired thickness larger than that of the film formed by sputtering.

Although the layer represented by numeral 16 serves as a lower core layer and an upper shield layer in the embodiments, the lower core layer and the upper shield layer may be individually formed. In this case, an insulating layer may be formed between the lower core layer and the upper shield layer.

A typical manufacturing method of the thin-film magnetic heads shown in FIGS. 1 to 7 will now be described.

In the thin-film magnetic head shown in FIGS. 1 and 2, the Gd controlling layer 17 is formed on the lower core layer 16. Then, the magnetic pole 18 comprising the lower magnetic pole layer 19, the nonmagnetic gap layer 20, and the upper magnetic pole layer 21 is formed by consecutively plating from the face opposing a recording medium in the height direction. After the magnetic pole 18 is provided with the insulating layer 23 at the back thereof in the height direction, the top surfaces of the magnetic pole 18 and the insulating layer 23 are planarized by chemical mechanical polishing (CMP). Then, the coil layer 24 is spirally patterned on the insulating layer 23 and the organic insulating layer 25 is deposited on the coil layer 24. Finally, the upper core layer 22 is formed on the magnetic pole 18 and the organic insulating layer 25 by flame plating.

In the thin-film magnetic head shown in FIGS. 3 and 4, the insulating layer 31 is deposited on the lower core layer 16 and is provided with the track-width-controlling slit 31a therein towards the rear in the height direction from the face opposing a recording medium by means of resist. The track-width-controlling slit 31a is provided with slopes 31a shown in FIG. 3

The lower magnetic pole layer 32 and the nonmagnetic gap layer 33 are formed in the track-width-controlling slit 31a. After the Gd controlling layer 37 is formed on the gap layer 33 and the insulating layer 31, the upper magnetic pole layer 34 is formed on the gap layer 33 by plating. Then, the coil layer 38 is spirally patterned on the insulating layer 31 and consequently is covered with the organic insulating layer 39. Finally, the upper core layer 40 is formed on the upper magnetic pole layer 34 and the organic insulating layer 39 by, for example, flame plating.

In the thin-film magnetic heads shown in FIGS. 5 and 6, the gap layer 41 and the insulating layer 46 are formed on the lower core layer 16 in that order. Then, the coil layer 44 is patterned on the insulating layer 43. After covering the coil layer 44 with the insulating layer 45, the upper core layer 46 is formed on the gap layer 41 and the insulating layer 45 by flame plating.

In the thin-film magnetic head shown in FIG. 7, the lower magnetic pole layer 50 is formed on the lower core layer 16, and then is provided with the insulating layer 51 on the back thereof in the height direction. After planarizing the lower magnetic pole layer 50 and the insulating layer 51 by CMP, the top surface of the insulating layer 51 is recessed to be the coil-forming surface 51a. Next, the gap layer 52 is formed on the lower magnetic pole layer 50 and the insulating layer 51, and consequently the coil layer 53 is spirally patterned on the gap layer 52. The coil layer is covered with the organic insulating layer 54. Finally, the upper core layer 55 is patterned on the gap layer 52 and the organic insulating layer 54 by, for example, flame plating.

A manufacturing method of the CoFe alloy of which the Fe content is in the range of 68 to 80 mass % will now be described.

The CoFe alloy is prepared by electroplating with a pulsed current in the present invention.

In electroplating using a pulsed current, the current is intermittently applied by, for example, repeating on-off control by a current controlling device. By setting a pause time for applying no current, the CoFe alloy film can be gradually deposited, and further, the deviation of the current densities at plating can be alleviated in comparison with conventional plating with a direct current even when the Fe concentration in the plating bath is increased.

The current is preferably pulsed in a cycle of few seconds so that the duty ratio becomes about 0.1 to 0.5. The conditions for applying the pulsed current affect the average crystalline grain size and the center line average roughness Ra of the CoFe alloy film.

Since the electroplating with a pulsed current alleviates the deviation of the current densities at plating, the Fe content of the CoFe alloy can be larger than CoFe alloys formed by electroplating with a direct current.

Furthermore, the composition of the CoFe alloy in the plating bath is set such that the Fe/Co ion concentration ratio is in the range of 1.5 to 2.5. Thus, the Fe content of the alloy can be controlled in the range of 68 to 80 mass %, and a high saturation magnetic flux density Bs of 2.25 T or more is ensured.

Also, the CoFe alloy formed of the composition described above has a center line average roughness Ra of 9 nm or less, thus resulting a corrosive resistant soft magnetic film.

In contrast, a CoFe alloy formed of a composition having an Fe/Co ion concentration ratio outside the range of 1.5 to 2.5 does not necessarily have a high saturation magnetic flux density. Specifically, in some CoFe alloy films, the saturation magnetic flux density is 2.0 T or more and in the others, it is less than 2.0 T. Also, such a CoFe alloy results in a corrosive soft magnetic film having a center line average roughness Ra of more than 9 nm.

The Fe concentration in the plaiting bath is preferably lower than that in the conventional plating, and more specifically is in the range of 1.0 to 1.5 g/L. Although the conventional Fe concentration is, for example, about 4.0 g/L, a lower Fe concentration leads to improved stirring effects which adequately increase the Fe content of the CoFe alloy.

In the present invention, by plating with a pulsed current at an Fe/Co ion concentration ratio in the range of 1.5 to 2.5, a CoFe alloy having a higher saturation magnetic flux density Bs of 2.0 T or more can be formed. Also, this CoFe alloy results in a dense crystalline film having smooth surfaces; hence, a corrosion resistant plated film having a high coercive force can be formed.

Preferably, sodium saccharin ($C_6H_4CONNaSO_2$) is added to the plaiting bath for the CoFe alloy to serve as a stress alleviator, thereby lowering the film stress of the CoFe alloy.

Preferably, 2-butyne-1,4-diol is further added to the plating bath for the CoFe alloy to inhibit the formation of coarse CoFe alloy crystals, thereby lowering the coercive force Hc.

Preferably, sodium 2-ethylhexyl sulfate is further added to the plating bath for the CoFe alloy.

Sodium 2-ethylhexyl sulfate serves as a surfactant, eliminating hydrogen generated by forming the plated CoFe alloy to prevent the hydrogen from being trapped on the plated film. The hydrogen trapped on the plated film interferes with the formation of a dense crystalline film, thus causing a rough film surface. Therefore, by eliminating hydrogen according to the present invention, a smooth film surface and a low coercive force Hc can be achieved.

Sodium lauryl sulfate may be used instead of sodium 2-ethylhexyl sulfate; however, sodium lauryl sulfate tends to foam in the plating bath in comparison with sodium 2-ethylhexyl sulfate, and therefore it is difficult to effectively eliminate the hydrogen under the condition in which sodium lauryl sulfate is contained. Accordingly, an amount of sodium 2-etylhexyle sulfate capable of eliminating the hydrogen is preferably added.

Preferably, boric acid is added to the plating bath to serve as a pH buffer agent on the electrode surface, thereby effectively glossing the plated film.

The CoFe alloy having an Fe content in the range of 68 to 80 mass % is used for the thin-film magnetic heads shown in FIGS. 1 to 7 according to the embodiments of the present invention. The use of the CoFe alloy is, however, not restricted to these thin-film magnetic heads and may, for example, be used for a planar magnetic element such as a thin-film inductor.

EXAMPLES

CoFe alloys having various composition ratios were formed by plating with a pulsed current in the plating bath having various Fe/Co ion concentration ratios.

Table 1 shows the compositions of the plating bath having Fe/Co ion concentration ratios of less than 1.5 (Comparative Example 1).

TABLE 1

| | | |
|---|---|---|
| Fe ion | 4 | g/L |
| Co ion | 6.5, 7.5, 9 | g/L |
| Sodium saccharin | 1 | g/L |
| Sodium lauryl sulfate | 0.02 | g/L |
| 2-butyne-1,4-diol | 0 | g/L |
| Boric acid | 25 | g/L |
| Sodium chloride | 25 | g/L |

As shown in Table 1, the Fe ion concentration was 4 g/L. The Co ion concentration was set to 6.5, 7.5, or 9 g/L with the Fe ion concentration fixed to form CoFe alloys.

Table 2 shows the compositions of the plating bath having Fe/Co ion concentration ratios in the range of 1.5 to 2.5 (Example).

TABLE 2

| | | |
|---|---|---|
| Fe ion | 1.23, 4.0 | g/L |
| Co ion | 0.57, 0.69, 1.6 | g/L |
| Sodium saccharin | 1 | g/L |
| Sodium lauryl sulfate | 0.02 | g/L |
| 2-butyne-1,4-diol | 0, 0.1, 0.2, 0.4, 0.8, 1.2, 2, 2.8 | g/L |
| Boric acid | 25 | g/L |
| Sodium chloride | 25 | g/L |

As shown in Table 2, the Fe ion concentration is 1.23 or 4.0 g/L. The Co ion concentration was varied to 0.57, 0.69, and 1.6 g/L with the Fe ion concentration fixed at 1.23 g/L to form CoFe alloys, or the Co ion concentration was changed to 1.6 g/L with the Fe concentration changed to 4.0 g/L.

Table 3 shows the compositions of the plating bath having Fe/Co ion concentration ratios of more than 2.5 (Comparative Example 2).

TABLE 3

| | | |
|---|---|---|
| Fe ion | 4 | g/L |
| Co ion | 0.11, 0.34, 0.57, 0.91, 1.26 | g/L |
| Sodium saccharin | 1 | g/L |
| Sodium lauryl sulfate | 0.02 | g/L |
| 2-butyne-1,4-diol | 0 | g/L |
| Boric acid | 25 | g/L |
| Sodium chloride | 25 | g/L |

As shown in Table 3, the Fe ion concentration was 4 g/L. The Co ion concentration was varied to 0.11, 0.34, 0.57, 0.91, and 1.26 g/L with the Fe ion concentration fixed to form CoFe alloys.

Each plating bath contained sodium saccharin, sodium lauryl sulfate, 2-butyne-1,4-diol, boric acid, and sodium chloride in combination with Fe and Co ions as shown in Tables 1 to 3.

The CoFe alloys are formed under the following conditions: the plating bath temperature of 30° C.; the electrode pH of 2.8; the current density of 46.8 $mA/cm^2$; and the pulsed current duty ratio (ON/OFF) of 400/1000 msec. In addition, an Fe electrode was used for the anode.

The soft magnetic properties and the film characteristics of the CoFe alloys formed of the compositions above will now be described.

TABLE 4

| | |
|---|---|
| Fe content | 59–67 mass % |
| Bs | 2.25 T or less |
| Surface roughness | greater than 9 nm |
| Film stress | 230 MPa or less |

Table 4 shows experimental results according to Table 1, that is, Comparative Example 1 in which the Fe/Co ion concentration ratios were less than 1.5. The Fe contents of the resulting alloy were in the range of 59 to 67 mass % and the saturated magnetic flux densities Bs were 2.25 T or less. Some saturated magnetic flux densities were more than 2.0 T and the others were 2.0 T or less, exhibiting unstable saturated magnetic flux densities. Also, each center line average roughness Ra of the alloy film was more than 9 nm; hence the film surface was extremely rough.

This is probably because an Fe/Co ion concentration ratio lower than 1.5 leads to an increased Co ion concentration in the plating solution in contact with the plating cathode surface (plated side) and to degraded stirring effects. As a result, the crystalline grain size of the CoFe alloy becomes larger as the Fe content of the CoFe alloy increases, the CoFe alloy thus having an extremely rough surface.

TABLE 5

| | |
|---|---|
| Fe content | 68–80 mass % |
| Bs | 2.25–2.3 T |
| Surface roughness | 9 nm or less |
| Film stress | 300–400 MPa |

Table 5 shows experimental results according to Table 2, that is, Example in which the Fe/Co ion concentration ratios were in the range of 1.5 to 2.5. The Fe contents of the resulting alloys were in the range of 68 to 80 mass % and the saturated magnetic flux densities Bs were in the range of 2.25 to 2.3 T. Table 5 suggests that Fe/Co ion concentration ratios in the range of 1.5 to 2.5 ensure saturated magnetic flux densities Bs of more than 2 T.

Also, each center line average roughness Ra of the alloy film was 9 nm or less, hence the film surface was effectively prevented from becoming rough.

An Fe/Co ion concentration ratio in the range of 1.5 to 2.5 increases the Fe concentration of the plating solution in contact with the plating cathode surface compared to Comparative Example 1 to improve stirring effects. Thus, as the Fe content of the CoFe alloy increases, the CoFe alloy has a smaller crystalline grain size and results in a dense film. As a result, The CoFe alloy can have a low saturation magnetic flux density and a smooth surface.

TABLE 6

| Fe content | 83 mass % or more |
| --- | --- |
| Bs | 2.2 T or less |
| Surface roughness | 10 nm or more |
| Film stress | 300–350 MPa |

Table 6 shows experimental results according to Table 3, that is, Comparative Example 2 in which the Fe/Co ion concentration ratios were more than 2.5. The Fe contents of the resulting alloys were 83 mass % and more and the saturated magnetic flux densities Bs were 2.2 T and less. Some saturated magnetic flux densities Bs were more than 2.0 T and the others were 2.0 T or less. Also, each center line average roughness Ra was 10 nm or more; hence the film surface was extremely rough.

When the Fe/Co ion concentration ratio is larger than 2.5, Fe precedes Co in depositing to cause excess deposition. In this instance, the crystalline grain size of the alloy tends to increase, and thus the CoFe alloy has a low saturation magnetic flux density Bs and a rough surface.

Whether the rough surface is reduced depends on not only Fe/Co ion concentration ratios but also Fe ion concentrations. The Fe concentration is preferably in the range of 1.0 to 1.5 g/L in the present invention although conventional Fe ion concentration is about 4.0 g/L. The lower Fe ion concentration than ever improve the stirring effects and increases the Fe content of the CoFe alloy, thus leads to a dense film having a small crystalline grain size and a reduced roughness of the film surfaces.

In the example of Table 2, 2-butyne-1,4-diol was added to reduce the crystalline grain size, and consequently few voids appeared among the crystals; hence the alloy film had a smooth surface.

The inventors investigated relationships between the Fe content and the nonmagnetic properties and film characteristics of the CoFe and NiFe alloys. The NiFe alloy was formed by plating with a pulsed current under the same conditions as the CoFe alloys.

Figure 8:
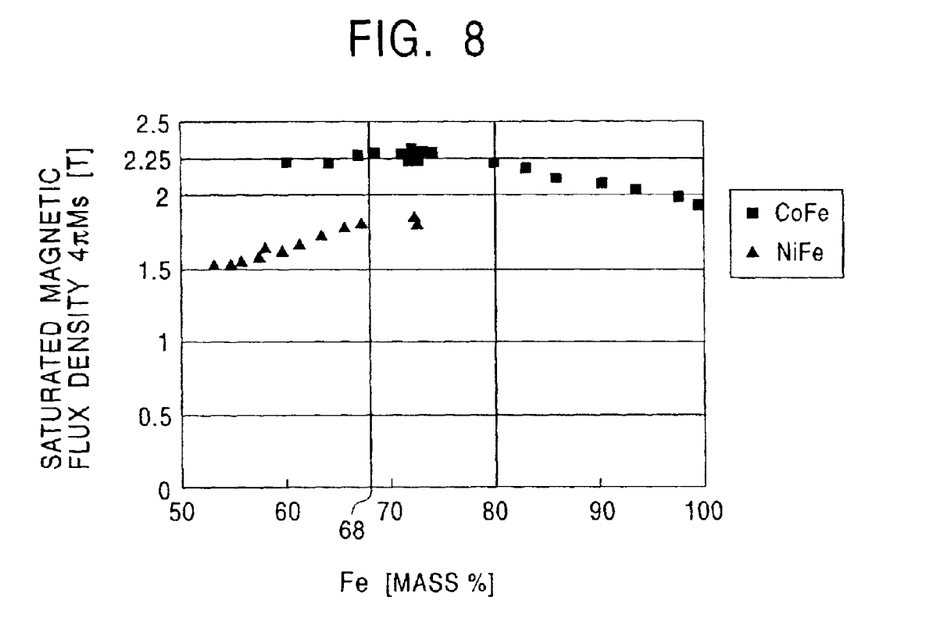
FIG. 8 is a graph showing a relationship between the Fe content and the saturation magnetic flux density of CoFe alloys and NiFe alloys formed by electroplating with a pulsed current.

FIG. 8 is a graph showing relationships between the Fe content and the saturation magnetic flux density Bs of the CoFe and NiFe alloys.

As shown in FIG. 8, the Fe content X of the NiFe alloys is at most about 73 mass % and no more Fe can be contained in the plated film. Also, the saturated magnetic flux densities Bs are not more than about 1.9 T and that of 2.0 T or more cannot be ensured.

In contrast, the CoFe alloys can have an Fe content of 43 mass % or more, and an Fe content in the range of about 60 to 90 mass % results in a saturation magnetic flux density Bs of 2.0 T or more; hence, the CoFe alloys increase the saturation magnetic flux density Bs in comparison with the NiFe alloys.

The CoFe alloy having an Fe content in the range described above, however, can increase the crystalline gain size depending on the Fe content and may degrade the roughness of the film surface.

Figure 9:
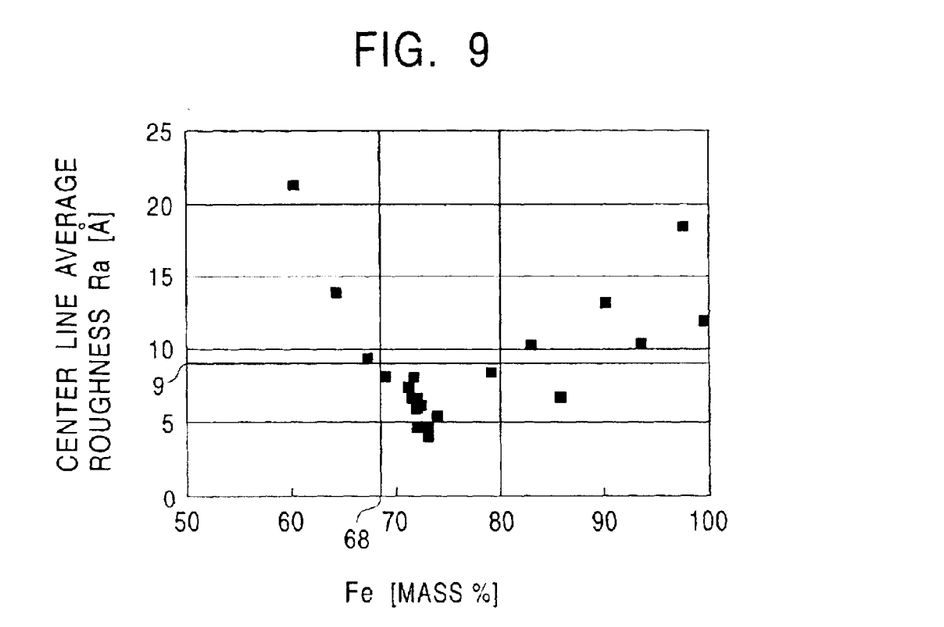
FIG. 9 is a graph showing a relationship between the Fe content and the center line average roughness Ra of CoFe alloys formed by electroplating with a pulsed current.

FIG. 9 is a graph showing a relationship between the Fe content and the center line average roughness Ra of the CoFe alloy films and suggests that Fe contents of about 75 mass % lead to the lowest center line average roughness Ra.

As shown in FIG. 9, an Fe content in the range of 68 to 80 mass % reduces the center line average to 9 nm or less.

The graph of the saturation magnetic flux density Bs shown in FIG. 8 suggests that an Fe content in the range of 68 to 80 mass % ensures a saturation magnetic flux density Bs of 2.25 T or more.

As described above, an Fe content of the CoFe alloy in the range of 68 to 80 mass % can achieve a saturation magnetic flux density Bs of 2.0 T or more, or more specifically 2.25 T or more, and a center line average roughness Ra of the film of 9 nm or less.

As suggested in Tables 2 and 5, an Fe/Co ion concentration ratio in the range of 1.5 to 2.5 improves stirring effects to achieve an Fe content of the CoFe alloy in the range of 68 to 80 mass %. Also, the crystalline grain size is reduced to form a dense film, thus a saturation magnetic flux density Bs of 2.0 T or more and a center line average roughness of 9 nm or less are achieved.

In addition, a dense film having a small crystalline grain size increases a lower coercive force Hc.

Figure 10:
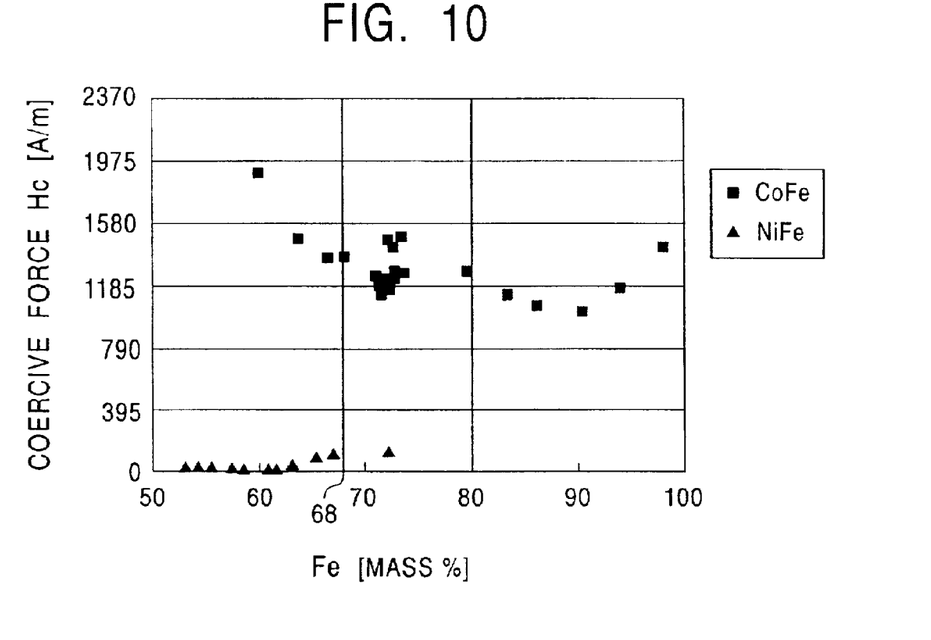
FIG. 10 is a graph showing a relationship between the Fe content and the coercive force Hc of CoFe alloys and NiFe alloys formed by electroplating with a pulsed current.

FIG. 10 shows relationships between the Fe content and the coercive force Hc of the CoFe and NiFe alloys. FIG. 10 suggests that the Fe contents of the CoFe alloys in the range of 68 to 80 mass % lead to coercive forces higher than those of the NiFe alloys, but ensure coercive forces of 1580 A/m or less.

Figure 11:
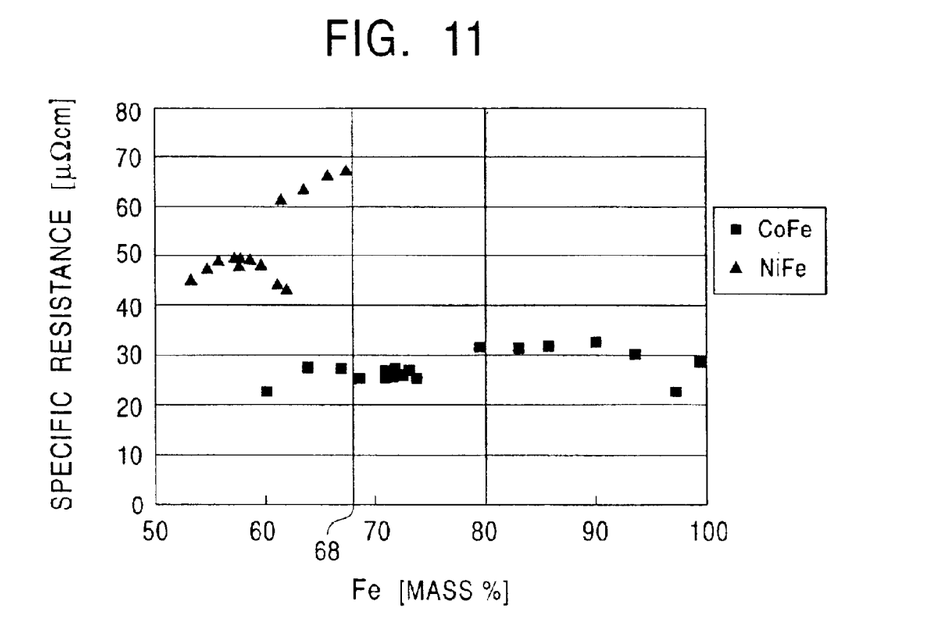
FIG. 11 is a graph showing a relationship between the Fe content and the specific resistance of CoFe alloys and NiFe alloys formed by electroplating with a pulsed current.

FIG. 11 is a graph showing relationships between the Fe content and the specific resistance of the CoFe and NiFe alloys. The specific resistance is preferably higher in a certain level for increased recording frequencies in order to inhibit eddy-current loss. FIG. 11 suggests that the Fe contents of the CoFe alloys in the range of 68 to 80 mass % lead to specific resistances in the CoFe alloys lower than those of the NiFe alloys, but ensure a specific resistance of 5 $\mu\Omega$•cm or more.

Figure 12:
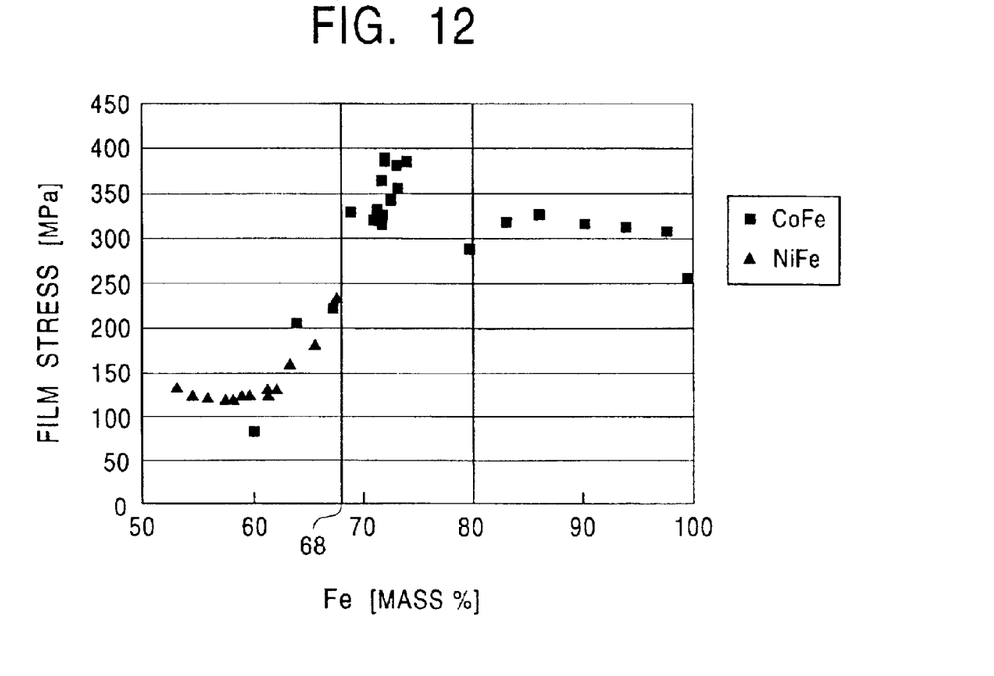
FIG. 12 is a graph showing a relationship between the Fe content and the film stress of CoFe alloys and NiFe alloys formed by electroplating with a pulsed current.

FIG. 12 is a graph showing relationships between the Fe content and the film stress of the CoFe and NiFe alloys. Preferably, the film stress is reduced to a certain degree. FIG. 12 suggests that the Fe contents of the CoFe alloys in the range of 68 to 80 mass % lead to film stresses higher than those of the NiFe alloys, but lower the film stress to 400 MPa or less.

Figure 13:
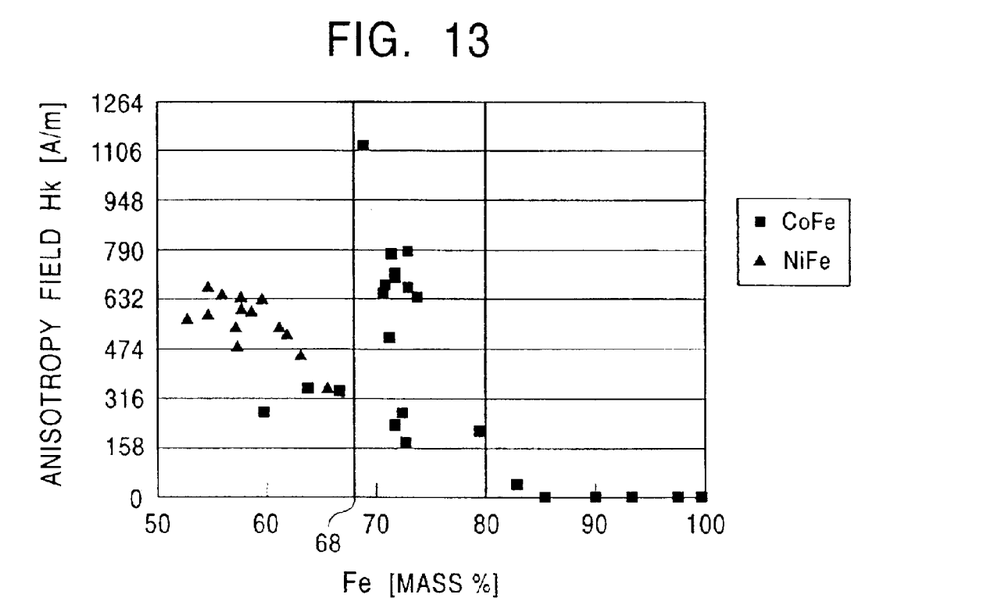
FIG. 13 is a graph showing a relationship between the Fe content and the anisotropy field Hk of CoFe alloys and NiFe alloys formed by electroplating with a pulsed current.

FIG. 13 is a graph showing relationships between the Fe content and the anisotropy field of the CoFe and NiFe alloys. FIG. 13 suggests that the Fe contents of the CoFe alloys in the range of 68 to 80 mass % achieve an anisotropy filed substantially equal to that of the NiFe alloys.

According to the present invention, an Fe content of CoFe alloy in the range of 68 to 80 mass % ensures a saturation magnetic flux density Bs of 2.0 T or more, which is higher than the saturation magnetic flux density of NiFe alloy. Also, the Fe content of the CoFe alloy results in a dense film having a small crystalline grain size and a center line average roughness Ra of 9 nm or less, thus achieving a corrosive resistant soft magnetic film.

The CoFe alloy is used for cores of thin-film magnetic head to manufacture a corrosive resistant thin-film magnetic head having a high recording density.

What is claimed is:

1. A thin-film magnetic head comprising:
   a lower core layer;
   an upper core layer; and
   a magnetic pole portion which lies between the lower core layer and the upper core layer, which has a shorter width in a track width direction than a width of each of the lower and the upper core layers, and which comprises a lower magnetic pole layer in contact with the lower core layer, an upper magnetic pole layer in contact with the upper core layer, and a gap layer lying between the lower magnetic pole layer and the upper magnetic pole layer,
   wherein at least one of the upper magnetic pole layer or the lower magnetic pole layer has at least two magnetic sub layers in which a first magnetic sub layer is in contact with the gap layer and is formed of a composition expressed by the formula $Co_{1-x}Fe_x$ and having the Fe content X in the range of 68 to 80 mass % and the remaining magnetic sub layers are formed of a CoFe alloy having an Fe content lower than that of the first magnetic sub layer.

2. A thin-film magnetic head according to claim 1, wherein an upper surface of the first magnetic sub layer has a center line average roughness of 9 nm or less.

3. A thin-film magnetic head according to claim 1, further comprising a Gd controlling layer on the lower core layer, wherein the magnetic pole layer is disposed between a face opposing a recording medium to the Gd controlling layer.

4. A thin-film magnetic head according to claim 1, further comprising a coupling layer between a base of the upper core layer and lower core layer.

5. A thin-film magnetic head comprising:
   a lower core layer;
   a lower magnetic pole layer projecting from a surface of the lower core lever at a face opposing a recording medium;
   a gap layer;
   an upper core layer opposing the lower magnetic pole layer with the gap layer therebetween at a face opposing the recording medium thereof; and
   a coil layer to apply a recording magnetic field to the lower and the upper core layers,
   wherein the lower magnetic pole layer has at least two magnetic sub layers in which a first magnetic sub layer is in contact with the gap layer and is formed of a composition expressed by the formula $Co_{1-x}Fe_x$ and having the Fe content X in the range of 68 to 80 mass % and the remaining magnetic sub layers are formed of a CoFe alloy having an Fe content lower than that of the first magnetic sub layer.

6. A thin-film magnetic head according to claim 5, further comprising a bank layer between a base of the upper core layer and lower core layer.

7. A thin-film magnetic head according to claim 5, wherein an upper surface of the first magnetic sub layer has a center line average roughness of 9 nm or less.

8. A thin-film magnetic head according to claim 5, wherein the upper magnetic pole layer has at least two magnetic sub layers in which a first upper magnetic sub layer is in contact with the gap layer and is formed of a composition expressed by the formula $Co_{1-x}Fe_x$ and having the Fe content X in the range of 68 to 80 mass %.

9. A thin-film magnetic head according to claim 8, wherein the remaining magnetic sub layers of the upper magnetic pole layer are formed of a CoFe alloy having an Fe content lower than that of the first upper magnetic sub layer.

10. A thin-film magnetic head according to claim 8, wherein the remaining magnetic sub layers of the upper magnetic pole layer are formed of a NiFe alloy.

* * * * *